Feb. 17, 1948.  E. C. CRAIG  2,435,956
STREAMLINED CONDUCTOR CABLE
Filed Dec. 9, 1942
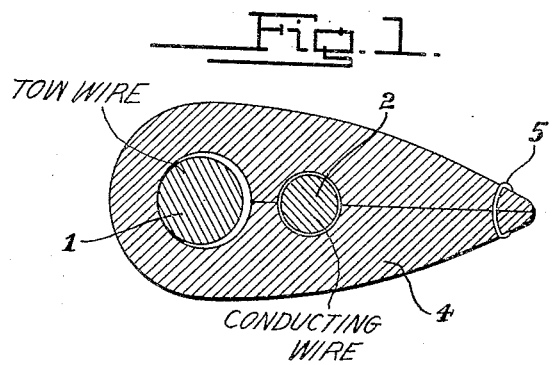
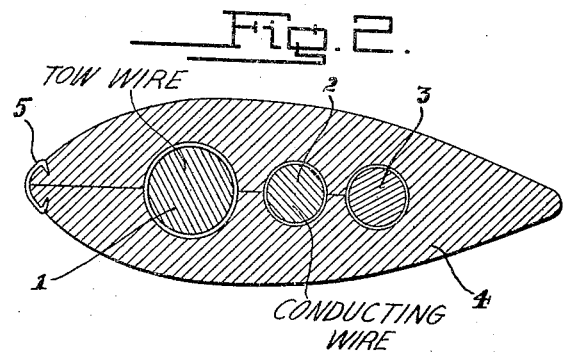
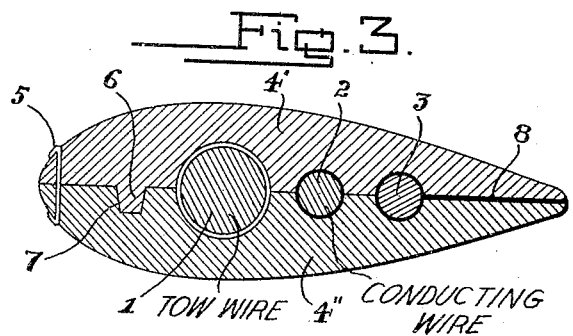
Edward C. Craig.
INVENTOR
BY
ATTORNEY Patented Feb. 17, 1948

2,435,956

UNITED STATES PATENT OFFICE 2,435,956

STREAMLINED CONDUCTOR CABLE

Edward C. Craig, United States Navy

Application December 9, 1942, Serial No. 468,415

1 Claim. (Cl. 174—101.5)

(Granted under the act of March 3, 1883, as amended April 30, 1928; 370 O. G. 757)

The device of the present invention is a flexible or articulated cable of streamlined form in cross-section combining a strength element and one or more electrical or fluid conductors or control elements.

The object of the invention is to enclose a towing cable for towing objects off the path of the towing means through water or other fluid, loosely in a streamlined flexible or articulated covering, so as to reduce the drag and eliminate vibration of the cable without subjecting the covering to any twisting action as a result of any twisting tendencies in the cable during the towing operation.

A further object is to include in the streamlined covering not only the towing cable above referred to, but also one or more electric cables for transmitting electrical energy between the towing means and the object being towed.

Another object is to provide means for loosely enclosing an aircraft or watercraft guy wire and other control or transmission lines running parallel thereto, in a common streamlined covering for the purpose of eliminating vibrations and reducing drag of the enclosed elements as they are driven broadside through the water or air, without transmitting any twisting forces from these elements to the covering.

Other objects will become apparent from the following detailed description of the invention and its many applications.

Illustration of three preferred forms of the invention are shown in the accompanying drawings.

In Fig. 1, a form of device having a strength element and only one electric cable is illustrated in section, showing how the one piece streamlined covering is formed and fastened over the cables.

Fig. 2 illustrates a form having two electric cables therein, and a one-piece streamline covering split from the forward edge.

Fig. 3 is a modification of the form shown in Fig. 2, in which the covering is made up of two complementary strips, cemented together at the trailing portion and stapled together at the forward edge.

Referring more specifically to the drawings, 1 indicates the strength element which may be a wire rope or other form of cable for transmitting the towing or other force, while 2 and 3 represent electric cables or other elements. Instead of electric cables or in addition thereto, there may be included hose or other means of transmitting fluids or control cables, etc., between the two extremities of the combined cable. The streamlined covering 4 in Figs. 1 and 2 has a unitary cross-section made of flexible material formed with grooves of the proper size and number to take care of all the elements to be enclosed thereby, there being only one such element besides the strength element, shown for purposes of illustration in Fig. 1, and two such elements are shown in Fig. 2. The covering may be held closed over the elements by wire staples 5, as shown in Figs. 1 and 2 or by any other suitable means.

Fig. 3 shows a form of covering the cross-section of which is made up of two complementary pieces 4' and 4" which may be joined by cementing at one portion 8 where they come together and fastened by wire staples at the opposite edges. A tongue 6 and corresponding groove 7 may be formed on the opposed surfaces of the two pieces to assist in the proper alignment of the grooves upon assembly of the covering over the elements.

The covering may be flexible or made of articulated construction consisting of rigid portions joined end to end by flexible connections or rigid portions aligned end to end but unjoined.

Some of the advantages of this invention are that the cables or other elements assembled in this covering furnish much less resistance, thus requiring less power for their movement through the water or air through which they are caused to travel, and the elements last longer because of the protecting covering and because their tendency to vibrate is practically eliminated by the streamlining which always aligns itself properly with the direction of motion, since the strength element which is also the driving element for the streamlining fits loosely in the nose thereof. A typical example of the use of this invention is on a cable for towing a paravane having some electrical apparatus on it with the necessary electric cables stretched out thereto. It is to be noted that this combination eliminates the stresses from the electric cables or other elements which would otherwise result from the stretching of these elements between their two extremities.

Many changes in form, material and dimensions may be made within the scope of the appended claim.

This invention may be made for or by the Government of the United States for governmental purposes without the payment to me of any royalty thereon.

What I claim is:

A streamlined conductor cable including a strength cable element, a thick solid streamlinesectioned covering member freely pivotal on said strength cable element, at least one conducting element extending parallel to said strength element, said covering member having an oversize bore extending therethrough for each of the elements, the bore for the strength element being located ahead of the others with respect to the streamlined section so as to cause the member to assume streamline position when the conductor cable is drawn through a fluid medium.

EDWARD C. CRAIG.

REFERENCES CITED

The following references are of record in the file of this patent:

UNITED STATES PATENTS

| Number | Name | Date |
|---|---|---|
| 1,315,356 | Willard | Sept. 9, 1919 |
| 1,324,014 | Upson | Dec. 2, 1919 |
| 1,392,271 | Curtiss | Sept. 27, 1921 |
| 1,756,972 | Conner | May 6, 1930 |

FOREIGN PATENTS

| Number | Country | Date |
|---|---|---|
| 108,761 | Great Britain | Aug. 23, 1917 |
| 129,711 | Great Britain | July 24, 1919 |